INVENTORS
ROWLAND E. JOHNSON
ROBERT J. PATTERSON
ANDRE E. TILTON

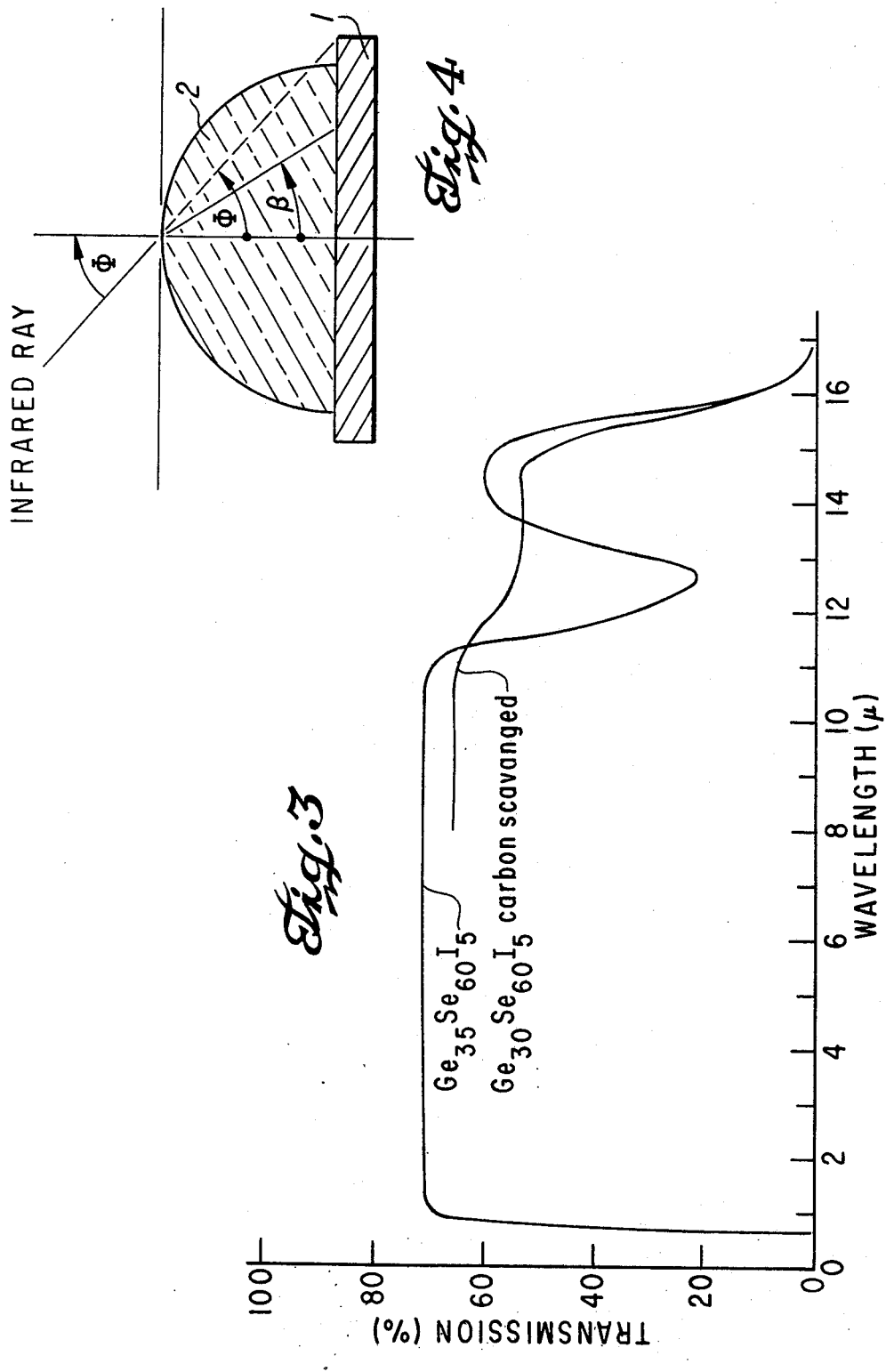

United States Patent Office 3,505,522
Patented Apr. 7, 1970

3,505,522
AMORPHOUS GLASS COMPOSITIONS
Rowland E. Johnson and Robert J. Patterson, Dallas, and Andre E. Tilton, Palno, Tex., assignors to Texas Instruments Incorporated, Dallas, Tex., a corporation of Delaware
Filed Apr. 13, 1967, Ser. No. 630,724
Int. Cl. G01t *1/16;* C03c *3/30*
U.S. Cl. 250—83                    8 Claims

ABSTRACT OF THE DISCLOSURE

Disclosed are compositions of matter comprising germanium, selenium and iodine, many samples of which have been found to be amorphorus glasses transmitting in the infrared region of the electromagnetic spectrum, and some samples of which have been found to be crystalline. Also disclosed are methods of compounding and casting these compositions, and of obtaining viscosity data for the glasses, and an illustration of the use of the glass compositions of this invention as transmitting elements within an infrared detection system.

---

This invention relates to amorphous compositions of matter comprising germanium, selenium, and iodine which have been found to be glasses transmitting in the infrared region of the electromagnetic spectrum.

The invention provides amorphous glass compositions having good transmission in the 1–16 micron wavelength region of the electromagnetic spectrum. The glasses of the invention may contain about 10 to 40 atomic percent germanium, 35–75 atomic percent selenium, and from greater than zero to 45 atomic percent iodine, and may be made by reacting the constituents at a temperature above 800° C. to form a melt and quench cooling the melt-containing vessel in air at room temperature.

It is therefore an object of the invention to provide a ternary amorphous glass composition comprising from 10–40 atomic percent germanium, 35–75 atomic percent selenium, and from greater than zero to 45 atomic percent iodine.

Other objects of the invention are to provide ternary germanium-selenium-iodine amorphous glass compositions exhibiting high softening and strain points and good transmittance at high temperatures in the 1–20 micron wavelength region of the electromagnetic spectrum.

A further object of the invention is to provide a ternary germanium-selenium-iodine amorphous glass composition having the high resistance to decomposition and devitrification required for the remelting and slow-cooling operations associated with casting.

These and other objects, advantages, and features of the invention will become more readily understood from the following detailed description when read in conjunction with the appended claims and attached drawings wherein:

FIGURE 3 is a graphical representation of percent transmission at room temperature at various wavelengths of the electromagnetic spectrum for various glass compositions according to the invention; and FIGURE 4 illustrates one particular form of the glass composition of this invention, usable as an infrared transmitting element, such as a dome or lens, within an infrared detection system.

Figure 1:
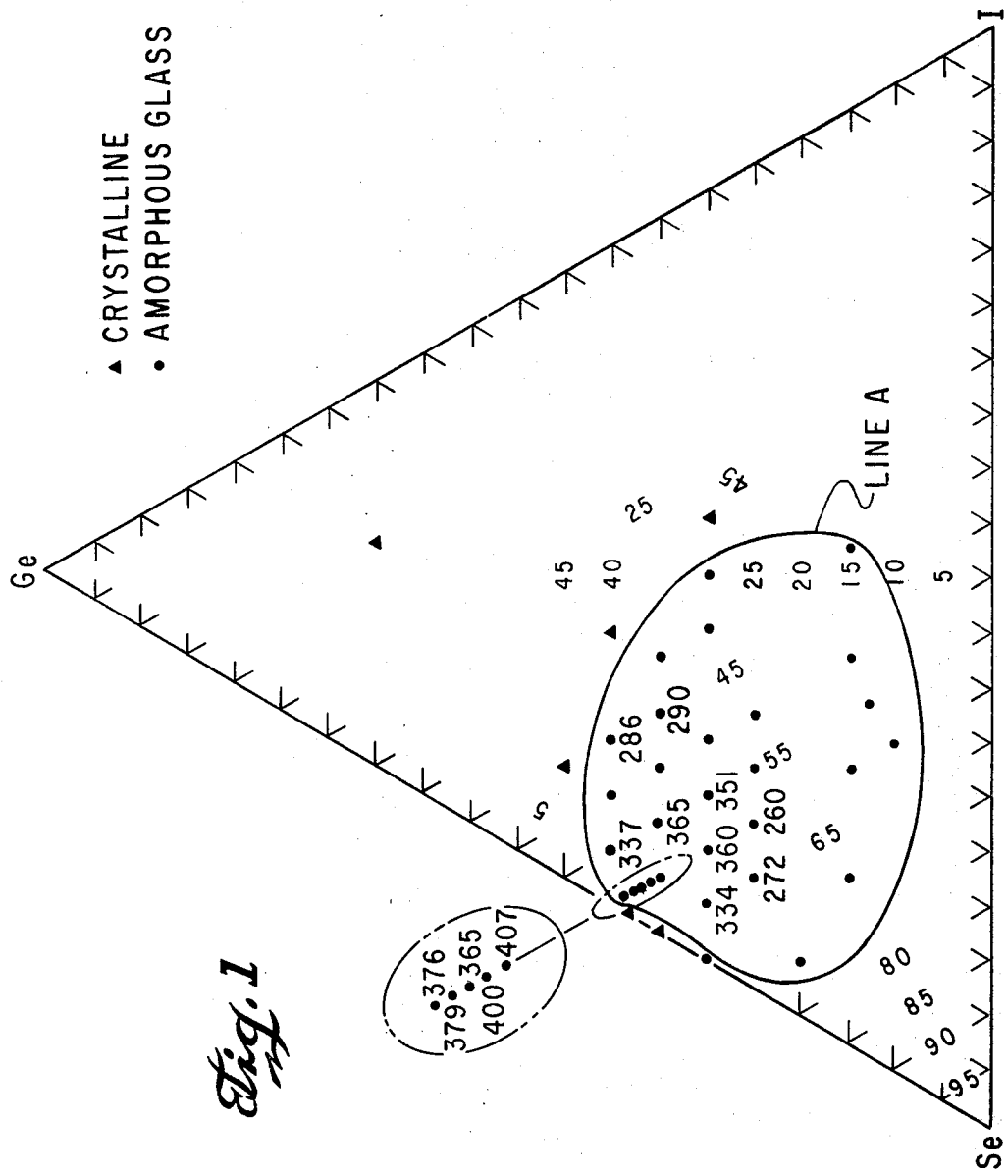
FIGURE 1 depicts a ternary diagram of the atomic percentages of germanium, selenium, and iodine for various compositions of matter of the invention.

Referring to FIGURE 1, various compositions of germanium, selenium, and iodine were compounded and evaluated to determine whether they were amorphous or crystalline. The general procedure for making the various compositions is described hereinafter.

Various atomic percentages of germanium, selenium, and iodine were chosen for each sample to be made. The appropriate amounts of the constituents were weighed and then placed in a previously cleaned quartz ampoule. An example of a suitable cleaning step for the ampoule is brushing in a suitable detergent solution, rinsing thoroughly in deionized water, and then drying. The total weight of each of the sample was between five and fifteen grams. The constituents were placed in the cleaned tube, evacuated to about $10^{-3}$ torr, and sealed. The sealed tube was then placed in a furnace and gradually heated to a temperature above 800° C., for example 900° C., and held at the latter temperature for a time sufficient for the constituents to react completely with one another. The furnace was a rocking furnace which may be of any suitable design to provide agitation of the constituents so as to achieve complete reaction thereof. The ampoules containing the samples were then removed from the furnace and held in a vertical position in air for air quenching and allowed to cool to room temperature. Care was taken throughout the process to prevent heating the constituents in air to avoid causing any oxide formation. In particular, in some cases the inside surface of the ampoule was coated with carbon for the purpose of chemically reducing any extraneous oxides present.

The sample compositions which failed to form amorphous glasses by the air quench-cooling technique and were crystalline after quenching are presented in Table I below, whereas the compositions which formed amorphous glasses are presented in Table II below. The reaction conditions for the samples in Tables I and II were the same.

TABLE I.—CRYSTALLINE COMPOSITIONS

| Sample No. | Composition (atomic percent) | | |
|---|---|---|---|
| | Ge | Se | I |
| 72–10 | 45 | 45 | 10 |
| 72–11 | 40 | 35 | 25 |
| 72–13 | 65 | 20 | 15 |
| 72–17 | 30 | 30 | 40 |

TABLE II.—AMORPHOUS GLASS COMPOSITIONS

| Sample No. | Composition (atomic percent) | | |
|---|---|---|---|
| | Ge | Se | I |
| 84–1 | 39 | 60 | 1 |
| 84–2 | 38 | 60 | 2 |
| 84–3 | 37 | 60 | 3 |
| 84–4 | 36 | 60 | 4 |
| 84–5 | 35 | 60 | 5 |
| 59–1 | 35 | 60 | 5 |
| 59–2 | 30 | 60 | 10 |
| 72–1 | 30 | 65 | 5 |
| 72–2 | 25 | 65 | 10 |
| 72–3 | 25 | 60 | 15 |
| 72–4 | 30 | 55 | 15 |
| 72–5 | 35 | 55 | 10 |
| 72–6 | 40 | 55 | 5 |
| 72–7 | 40 | 45 | 15 |
| 72–8 | 35 | 45 | 20 |
| 72–9 | 37 | 60 | 3 |
| 72–12 | 30 | 40 | 30 |
| 72–14 | 15 | 70 | 15 |
| 72–16 | 15 | 50 | 35 |
| 72–20 | 25 | 50 | 25 |
| 72–21 | 40 | 50 | 10 |
| 72–22 | 35 | 50 | 15 |
| 72–23 | 25 | 55 | 20 |
| 72–24 | 10 | 60 | 30 |
| 72–25 | 30 | 50 | 20 |
| 72–27 | 35 | 40 | 25 |
| 72–28 | 30 | 35 | 35 |
| 72–29 | 15 | 40 | 45 |
| 72–30 | 20 | 75 | 5 |

The crystalline compositions presented in Table I are indicated in FIGURE 1 by black triangular dots. The amorphous compositions presented in Table II are indicated in FIGURE 1 by black circular dots. In the figure, a is determined. Both high strain points and high $\Delta E_{vis}$ values are desirble.

The softening points, strain points and $\Delta E_{vis}$ for a number of the samples listed in Table II are given in Table III.

TABLE III.—VISCOSITY-TEMPERATURE DATA FOR Ge-Se-I GLASSES

| Sample No. | Composition (atom percent) | | | Softening points (° C.) | | Strain point (° C.) | $\Delta E_{vis}$, deg. ($\times 10^{-3}$) |
|---|---|---|---|---|---|---|---|
| | Ge | Se | I | Method A | Method B | | |
| 84-1 | 39 | 60 | 1 | 376 | 395 | 322 | 75 |
| 84-2 | 38 | 60 | 2 | 379 | 400 | 319 | 72 |
| 84-3 | 37 | 60 | 3 | 391 | 414 | 326 | 62 |
| 84-4 | 36 | 60 | 4 | 400 | 424 | 337 | 60 |
| 84-5 | 35 | 60 | 5 | 398 | 427 | 319 | 52 |
| 59-1 | 35 | 60 | 5 | 407 | 440 | 325 | 48 |
| 59-2 | 30 | 60 | 10 | 360 | 394 | 273 | 40 |
| 72-1 | 30 | 65 | 5 | 334 | 374 | 238 | 32 |
| 72-2 | 25 | 65 | 10 | 260 | 288 | 185 | 35 |
| 72-3 | 25 | 60 | 15 | 272 | 308 | 186 | 29 |
| 72-4 | 30 | 55 | 15 | 351 | 384 | 268 | 40 |
| 72-5 | 35 | 55 | 10 | 365 | 392 | 299 | 51 |
| 72-6 | 40 | 55 | 5 | 337 | 355 | 290 | 67 |
| 72-7 | 40 | 45 | 15 | 286 | 302 | 240 | 63 |
| 72-8 | 35 | 45 | 20 | 290 | 315 | 222 | 43 | boundary line, Line A, is drawn to designate the glass-forming composition region in the Ge-Se-I system. Certain of the amorphous samples are identified by their softening point as determined by method A, described hereinafter. The method A softening points of compositions containing 60 atomic percent selenium and from 1–5 atomic percent iodine are given in the insert on FIGURE 1. Those compositions outside the region bounded by Line A form crystals when quenched as described. These crystalline compositions scatter, rather than transmit infrared radiation, because of hte reflection and refraction of light at the boundaries between the different phases in the crystalline material.

Glasses are supercooled liquids and do not have "melting points." Instead, the highly viscous glass softens as the temperature increases and a softening temperature may be defined at a specified viscosity. The softening points used herein were determined according to the temperature and viscosity at which the glass deformed under the following stress conditions.

A polished sample 0.85±0.15 mm. thick was placed in a suitable heater enclosure and a point quartz rod, spring-loaded to 70 grams, pressed against one face; a thermocouple measured the temperature of the opposite face. The temperature was raised at a rate of 8 to 10° C. per minute until the point penetrated 0.05 mm. (0.002 inch) into the sample. This "softening point" was designated method A softening point and corresponded to a viscosity of $1 \times 10^{10.2}$ poise as determined by calibration against a standard glass, No. 712, obtained from the National Bureau of Standards. The method B softening point was determined by allowing the point quartz rod to penetrate 0.45 mm. into the sample. Method B softening point corresponded to a viscosity of $1 \times 10^{8.8}$ poise. The two softening points were used to determined other viscosity points for the sample and to characterize glasses of various compositions.

An important property of glasses to be used at high temperatures is the strain point. This point is the temperature at which the glass has a viscosity of $1 \times 10^{14.6}$ poise and may be taken as the maximum use temperature for the glass. Above this temperature, permanent strains may be introduced into the glass. Strain points for each sample may be readily determined by plotting softening point A and softening point B as reciprocal absolute temperatures against the logarithm to the base ten of their corresponding viscosities and drawing a straight line through these points. The strain point temperature is derived from the viscosity point $1 \times 10^{14.6}$ poise in the plot. The slope of the straight line describes the temperature dependence of viscosity for the glass and from it the term $$\Delta E_{vis} (\Delta E_{vis} = 2.303 \times slope)$$

The softening points, as determined by method A, of the Ge-Se-I glasses tested, range of 407° C. for Sample No. 59-1. Referring to FIGURE 1, where certain of the amorphous samples are identified by their method A softening points, it may be seen that those glasses having higher softening points are in the vicinity of Sample No. 59-1, $Ge_{35}Se_{60}I_5$.

Figure 2:
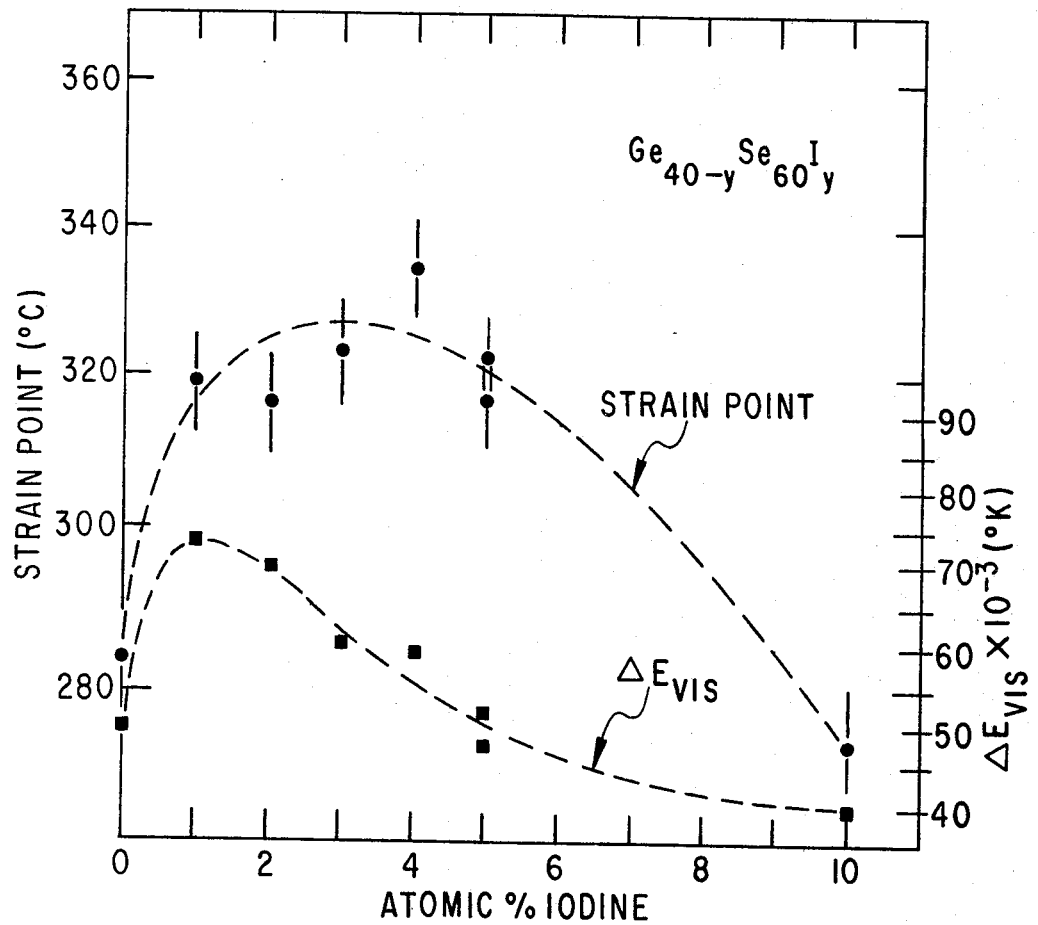
FIGURE 2 is a graph showing how increasing the percentage of iodine from zero to ten affects the strain point and viscosity-temperature function of a glass composition of this invention containing 60 atomic percent selenium.

The strain points of the Ge-Se-I glasses tested range to 337° C. for Sample No. 84-4. Strain point and $\Delta E_{vis}$ data for glass compositions bearing 60 atomic percent Se are plotted in FIGURE 2. The strain point values rapidly increase with increasing iodine concentration up to about 5 atomic percent, beyond which their values decrease. Similarly, $\Delta E_{vis}$ falls off rapidly beyond 1 to 2 atomic percent iodine concentration.

Sample 59-1, $Ge_{35}Se_{60}I_5$, and Sample 59-2, $Ge_{30}Se_{60}I_{10}$, were successfully cast by melting pieces of the compounded material in a quartz crucible maintained in a nitrogen ambient. The cast material did not decompose nor devitrify and remained transparent in the infrared after conforming to the shape of the container.

Transmission of the Ge-Se-I glasses is shown in the FIGURE 3. FIGURE 3 is a plot of percent transmittance vs. wavelength for representative samples given in Examples I and II, which follow. The materials are slightly red in color and begin transmitting light at about 0.7 micron. Transmission is about 70 from 1 to 14 microns in an uncoated sample. An absorption band occurs at 12.8 microns for glasses containing trace quantities of oxygen. However, as further shown in FIGURE 3 the band can be removed by careful processing technique and by scavenging the residual oxygen with a suitable reducing agent such as carbon or aluminum.

The following detailed description of the preparation and evaluation of two of the compositions given in Table II is intended to provide a further understanding of the invention.

EXAMPLE I

Preparation and evaluation of $Ge_{35}Se_{60}I_5$

The following elements were weighed into a quartz ampoule having an internal diameter of 12 mm.: germanium, electronic grade, 1.695 grams, selenium, 99.999% pure, 3.16 grams, iodine, reagent grade, 0.424 gram. The ampoule was evacuated to approximately 1 to $10 \times 10^{-3}$ torr. and was sealed by fusion with a hydrogen-oxygen torch. The ampoule containing the elements was gradually brought to a temperature of 830° C. over a period of four hours, and held at this temperature for 15 hours while the furnace assembly was rocked. After this reaction period the sample was rapidly withdrawn from the furnace to room air where it was air quenched to a solid. The sample was then allowed to cool more slowly to room temperature by wrapping the ampoule with quartz wool insulation. The quartz ampoule was then broken and the glassy material was removed.

The following tests were performed on this material:

Transmission: A sample 6.5 mm. thick was polished on two parallel surfaces and the transmission measured. The transmission vs. wavelength curve is shown in FIGURE 3 for this sample. Transmission begins at about 0.65 micron.

Knoop hardness: The above polished sample was used for hardness measurement. A Knoop hardness, 50 gram load, of 132 was measured.

Softening point: The softening points A and B were measured as previously described. The values were:

Softening point A=407° C.
Softening point B=440° C.

Temperature-viscosity data:

Strain point (viscosity=$10^{14.6}$)=325° C.
Anneal point (viscosity=$10^{13.4}$)=341° C.
Softening point (viscosity=$10^{7.6}$)=473° C.
$\Delta E_{vis}$=47.5×$10^3$ ° K.

(The above viscosity points are designated by the American Society of Testing Materials (ASTM) and are common to the glass industry).

Castability: Castability was evaluated by melting the material in a nitrogen ambient, allowing the melt to flow by gravity from an upper vessel through a small capillary to a lower vessel, and slow cooling the melt. The glass flowed through the capillary at a temperature of 605 to 615° C. The viscosity was about 1×$10^3$ poise, and the melt conformed to the shape of the lower vessel. In this method, decomposition is observed by observing condensable vapors arising from the surface of the melt. No decomposition was observed until the sample was heated to 680° C. which is well above the capillary flow temperature. Devitrification may be determined by observing the formation of crystals when the melt is cooled slowly and by observing a loss in transmission in the solidified melt. The melt was cooled about 20° C. per minute until solidified. A few yellow crystals, probably GeSe, formed on the upper surface of the melt; the bulk of the sample remained glassy. The sample was transparent to infrared radiation.

EXAMPLE II

Removal of residual oxygen from $Ge_{35}Se_{60}I_5$

The sample was prepared in the same way as in Example I, except that the inside of the ampoule was coated with carbon, the reaction temperature was 1000° C. and the total heating time was 85 hours.

A sample 7.7 mm. thick was evaluated for transmission from 8 to 16 microns wavelength. Removal of the absorption band at 12.6 microns was effected, as shown by the curve in FIGURE 3.

EXAMPLE III

Preparation and evaluation of $Ge_{30}Se_{60}I_{10}$

This sample was prepared in the same way as was $Ge_{35}Se_{60}I_5$ in Example I. The following elements were weighed: germanium, 2.18 gram selenium, 4.74 gram, iodine, 1.27 gram.

The following evaluations were made:

Transmission: The transmission of the sample was found to be comparable to that of $Ge_{35}Se_{60}I_5$.

Softening point:

Softening Point A=360° C.
Softening Point B=394° C.

Strain point and related viscosity date:

Strain Point=273° C.
Anneal Point=295° C.
Softening Point=426° C.
$\Delta E_{vis}$=39.9×$10^3$ ° K.

Castability: Castability of this sample was equal that of $Ge_{35}Se_{60}I_5$. The capillary flow temperature was slightly lower, 520° C.; moderate decomposition occurred at 620° C. A slight amount of yellow crystals formed on the upper surface; the sample remained glassy and transparent to infrared radiation.

The amorphous glass compositions of the invention exhibit the very desirable characteristic of having good transmittance at high temperature. These amorphous compositions have good transmittance at high temperature, because they are glassy and devoid of a discrete band structure. Therefore, they do not exhibit the free carrier absorption at high temperature common to crystalline semiconductor materials.

The amorphous glass compositions of this invention offer substantial advantages for the fabrication of transmitting elements for a variety of reasons. These compositions offer substantial advantages over crystalline material in that they may be heated to a plastic state and easily cast or worked into desired shapes and sizes. The high softening points of these glasses and their general strength and hardness offer ease in grinding, polishing, and handling operations, as well as stability to thermal shocks.

Of particular value are those Ge-Se-I compositions containing about 60 atomic percent Se. Those compositions comprising about 40 minus Y atomic percent germanium, about 60 atomic percent selenium, and Y atomic percent iodine where Y is from greater than zero through 15, can be cast, i.e., remelted and slow-cooled, without decomposition or devitrification. It has further been found that compositions of the above general formula have softening and strain points higher than other glasses in the Ge-Se-I system.

The glasses of the invention have high strain points-above 300° C. Therefore, they may be used for high temperature applications. Since the glasses transmit over a wide wavelengths span, they are useful for applications at the short wavelength end and in the long wavelength regions out to 14 microns. For example, the glasses may be employed as optical components for use with gallium arsenide light emitters (which emit at 0.9 mircon), and as lenses and windows for use in aerial reconnaissance apparatus. For the latter application, the two major wavelength regions which show good transmittance in the atmosphere 3 to 5 microns and 8 to 14 microns, are included within the glasses transmitting region. The use of the material of this invention in combination with other infrared devices, such as the $CO_2$ laser at 10.6 microns is apparent. A multitude of other applications will immediately suggest themselves to one skilled in the art. Since the refractive index and transmittance of these glasses varies slightly with composition, their optical characteristics may be tailored to suit specific applications. In addition, the cost of iodine is low compared to that of other elements which may be combined with germanium and selenium to form glasses, such as arsenic and antimony.

FIGURE 4 depicts a form of the glass compositions of this invention usable within a particular infrared detecting system. The detecting system is normally composed of a detector 1 having a responsive element sensitive to infrared energy striking its surface, and an infrared transmitting element 2 such as a dome or lens in optical connection with the detector. The optical properties of the amorphous glass compositions of this invention makes them particularly suited, among other applications, for use as the transmitting element 2. In addition to being substantially transparent to infrared rays over a board range of the infrared spectrum, as depicted in FIGURE 3, all of the compositions have relatively high indexes of refraction compared to oxide glasses, ranging from approximately 2.3 to 2.5 at 3–5 wevelength. Consequently, when infrared rays strike the dome 2 at the inicident angle, as pictured in FIGURE 4, the high index of refraction of the dome material causes the rays to be bent toward the detector unit 1 at the angle of refraction β, thus increasing the efficiency of detection.

Although the invention has been described with reference to a preferred method for making the amorphous compositions of matter, other methods may be resorted to without departing from the spirit and scope of the invention as defined by the appended claims.

What is claimed is:

1. An amorphous ternary glass composition consisting essentially of germanium, selenium, and iodine, and having 10 to 40 atomic percent germanium, 35 to 75 atomic percent selenium and from greater than zero to 45 atomic percent iodine.

2. In an infrared detection system including a detector sensitive to infrared energy and a transmitting element in optical connection with said detector, the improvement consisting of a transmitting element comprising a composition according to claim 1.

3. An amorphous glass composition lying within the region circumscribed by Line A in the ternary diagram of FIGURE 1.

4. A tenary amorphous glass composition comprising about 40 minus Y atomic percent germanium, about 60 atomic percent selenium, and Y atomic percent iodine where Y is from greater than zero through 15.

5. The amorphous glass composition of claim 4 where Y is 5.

6. The amorphous glass composition of claim 4 wherein Y is 10.

7. An amorphous ternary glass composition consisting essentially of germanium, selenium, and iodine, having 10 to 40 atomic percent germanium, 35 to 75 atomic percent selenium and from greater than zero to 45 atomic percent iodine and lying generally within the region circumscribed by Line A in the ternary diagram of FIGURE 1.

8. In an infrared detection system including a detector sensitive to infrared energy and a transmitting element in optical connection with said detector, the improvement consisting of a transmitting element comprising a composition according to claim 7.

References Cited

UNITED STATES PATENTS

| | | | |
|---|---|---|---|
| 3,117,013 | 1/1964 | Northover et al. | 106—47 |
| 3,348,045 | 10/1967 | Bran et al. | 106—47 X |
| 3,360,649 | 12/1967 | Bran et al. | 106—47 X |
| 3,370,965 | 2/1968 | Hilton et al. | 106—47 |

OTHER REFERENCES

Borisoua et al.: The Electrical Conductivity of Glassy GeSe, English translation from Zhurnal Krikladnoi Khimii, vol. 35, No. 4, April 1962, pp. 749–751.

TOBIAS E. LEVOW, Primary Examiner

M. L. BELL, Assistant Examiner

U.S. Cl. X.R.

106—47